April 15, 1930.   F. HODGKINSON   1,754,426
POWER INSTALLATION
Filed March 31, 1927
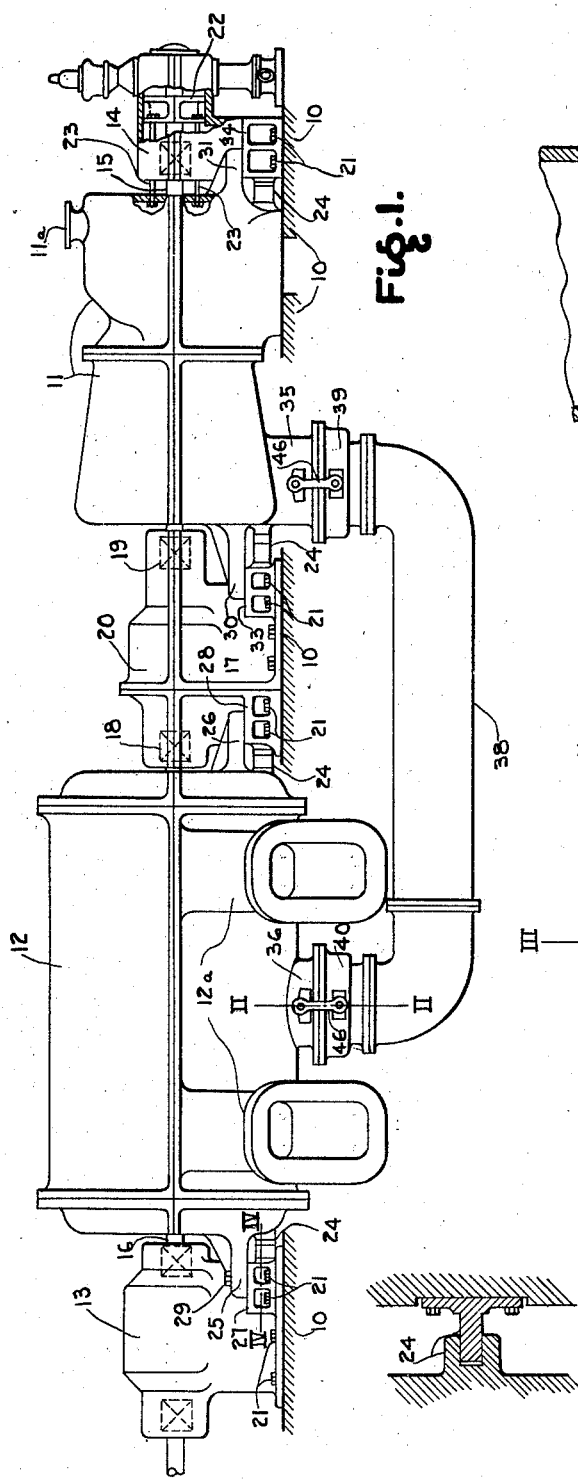
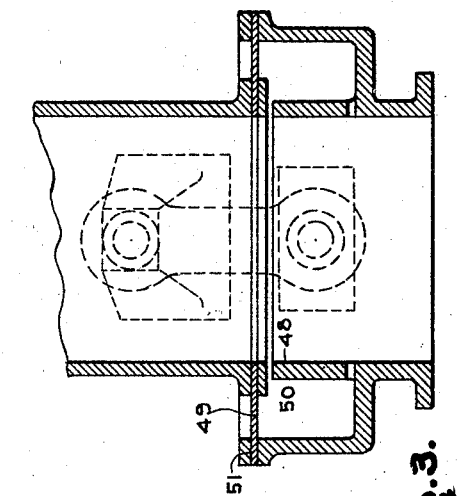
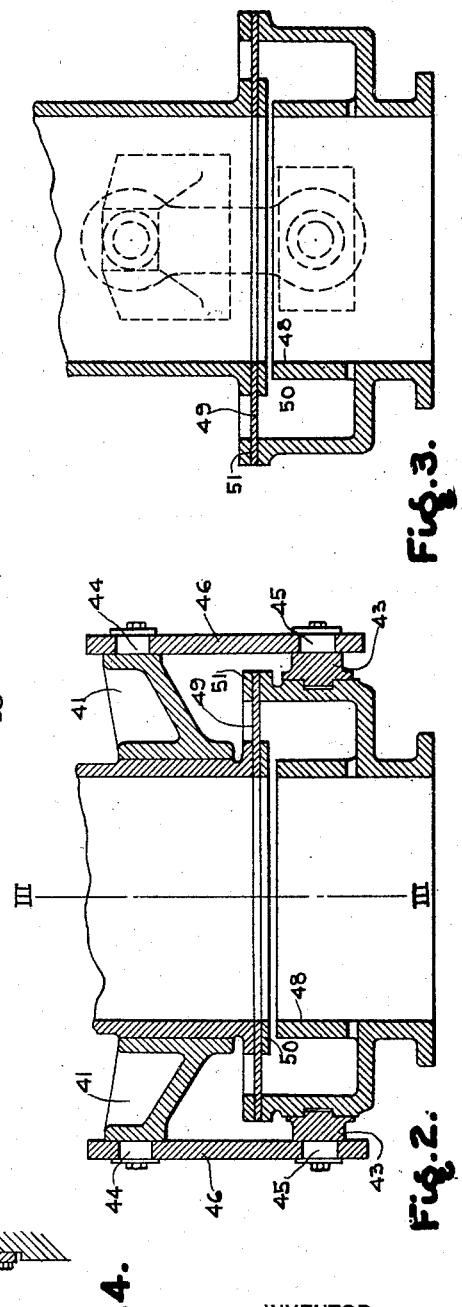
INVENTOR
F. Hodgkinson
BY
A. B. Reavis
ATTORNEY Patented Apr. 15, 1930

1,754,426

UNITED STATES PATENT OFFICE

FRANCIS HODGKINSON, OF SWARTHMORE, PENNSYLVANIA, ASSIGNOR TO WESTINGHOUSE ELECTRIC & MANUFACTURING COMPANY, A CORPORATION OF PENNSYLVANIA

POWER INSTALLATION

Application filed March 31, 1927. Serial No. 179,942.

My invention relates to means for passing motive fluid from one turbine to another, and has for an object to produce a connection for this purpose which shall include yieldable means to allow for misalignment and for unequal heating and which connection shall, at the same time, be sufficiently rigid to serve as a strut between the turbine cylinders.

Other and further objects of my invention will appear as the description proceeds.

Apparatus embodying the features of my invention is shown in the accompanying drawings, in which:

Fig. 1 is an elevational view showing my invention embodied in a power installation comprising a high-pressure and a low-pressure turbine arranged in tandem;

Fig. 2 is a section on the line II—II of Fig. 1, showing a part of the apparatus in Fig. 1, on a larger scale;

Fig. 3 is a section on the line III—III of Fig. 2; and,

Fig. 4 is a section on the line IV—IV of Fig. 1.

In the drawings, the foundation for my power installation is indicated, at 10; and a high-pressure turbine 11, having a steam inlet 11ª, and a low-pressure turbine 12, having exhaust connections 12ª, are shown arranged in tandem. Outside pedestal bearings 13 and 14 are provided for the rotor shafts 15 and 16, and an intermediate pedestal bearing structure 17 is provided with bearing portions 18 and 19 for the rotor shafts, and with a coupling housing portion 20. The bearing pedestals are anchored to the foundation by any suitable means, such as bolts indicated at 21.

The bearing pedestal 14 is arranged to slidably support the housing 22 for the thrust bearing for the high-pressure end of the installation. The housing 22 is connected to the turbine cylinder 11 by means of suitable struts 23, in order to maintain the proper relation between the rotor and the stator elements. Should it be desired to provide a thrust bearing for the low-pressure unit, the stationary elements of this bearing could be slidably mounted on the intermediate bearing pedestal 17 and connected to the turbine cylinder 12 by struts in a manner similar to that just described.

The casings of both turbines are connected to the adjacent bearing pedestals by means of vertically disposed tongue and slot connections 24, the medial vertical plane of which contains the axis of rotation. The low-pressure casing is also provided with feet 25 and 26 resting on suitable abutments 27 and 28, which may be formed on the adjacent bearing pedestals 13 and 17, respectively. The feet 25 are anchored to the foundation in any suitable manner, as by bolts 29. Hence, it will be seen that the low-pressure casing is free to move across its seating in response to changes of temperature.

The casing of the high-pressure turbine is provided with feet 30 and 31, which are arranged to be free to slide on abutments 33 and 34, which are associated with the adjacent bearing pedestals 17 and 14, respectively. The high-pressure turbine is provided with an exhaust connection 35, and the low-pressure turbine is provided with an inlet port, or connection 36. These ports of the respective turbines are connected by a rigid conduit 38.

The conduit 38 is provided with elbow ends and suitable flanges by means of which this conduit may be secured to the vertically disposed sections 39 and 40, which are, in turn, secured to the respective motive fluid connections on the turbine.

Suitable brackets 41 and 43 are mounted on the turbine cylinders and on the vertical sections 39 and 40 respectively. These brackets are provided with trunnions 44 and 45, respectively, and links, or the like, 46 are pivotally mounted on these trunnions so as to support the vertical sections from the turbine cylinders.

The vertical sections 39 and 40 of the conduit 38 are provided with an inner wall 48 which is, in effect, a continuation of the respective conduits through these sections. In this way, a continuity of smooth flow is assured.

A diaphragm 49 is secured to each of the respective motive fluid connections by a clamping ring 50, and to the cylindrical portion of the vertical sections 39 or 40 by a similar clamping ring 51. It will be understood, of course, that these clamping rings are held against the diaphragms and the associated connections in any approved manner, as by bolts, or the like (not shown).

In this way, it will be seen that a fluid-tight connection is provided, by means of the flexible diaphragm, which may yield in response to unequal heating, or for various other reasons, and due to the fact that the diaphragm is disposed in a substantially horizontal plane, it is capable of transmitting relatively great force in this plane, and, therefore, the interposition of such a diaphragm in the conduit 38 does not impair the ability of this conduit to transmit force axially of the turbines. Consequently, the expansion and contraction of an installation of this type is readily taken care of, the rigid conduit serving as a strut to push the high-pressure unit as the low-pressure unit moves across its seating in response to changes of temperature.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:—

1. In a power installation, the combination of a prime mover, a housing for the prime mover, a motive fluid connection for the prime mover and rigid with respect to the housing, a rigid conduit having an end arranged in fluid transmitting relation with the motive fluid connection, a diaphragm disposed transversely of the end of the rigid conduit and the motive fluid connection and forming a fluid-tight connection therebetween, and means additional to the diaphragm for pivotally supporting the rigid conduit from the housing.

2. In a power installation, the combination of a supporting structure; a pair of steam turbine elements connected in tandem relation; means for securing the turbine elements to the supporting structure and including means providing for a slight axial movement of the turbine elements with relation to the supporting structure; and means connecting the exhaust of one of the turbine elements with the inlet of the other turbine element and providing for the transmission of slight axial movements of either of the turbine elements to the other element; said last-mentioned means including a motive fluid connection on each of the turbine elements, a rigid conduit connecting the motive fluid connections of the turbine elements, and a flexible fluid-tight connection between the rigid conduit and at least one of the motive fluid connections and so constructed and arranged as to transmit movements which are in planes parallel to the axis of the turbine elements, from the conduit to such connection and vice-versa.

3. In a power installation, the combination of a supporting structure; a pair of steam turbine elements connected in tandem relation; means for securing the turbine elements to the supporting structure and including means providing for a slight axial movement of the turbine elements with relation to the supporting structure; and means connecting the exhaust of one of the turbine elements with the inlet of the other turbine element and providing for the transmission of slight axial movements of either of the turbine elements to the other element; said last-mentioned means including a motive fluid connection on each of the turbine elements, a rigid conduit connecting the motive fluid connections of the turbine elements, and a flexible fluid-tight connection between each of the ends of the rigid conduit and a motive fluid connection and so constructed and arranged as to transmit movements which are in planes parallel to the axis of the turbine elements, from the conduit to such connections and vice-versa.

4. In a power installation, the combination of a supporting structure; a pair of steam turbine elements connected in tandem relation; means for securing the turbine elements to the supporting structure and including means providing for a slight axial movement of the turbine elements with relation to the supporting structure; and means connecting the exhaust of one of the turbine elements with the inlet of the other turbine element and providing for the transmission of slight axial movements of either of the turbine elements to the other element; said last-mentioned means including a motive fluid connection on each of the turbine elements, a rigid conduit connecting the motive fluid connections of the turbine elements, and a flexible fluid-tight connection between the rigid conduit and at least one of the motive fluid connections and including a transversely disposed diaphragm arranged in a plane parallel to the axis of rotation of the turbine elements.

5. In a power installation, the combination of a supporting structure; a pair of steam turbine elements connected in tandem relation; means for securing the turbine elements to the supporting structure and including means providing for a slight axial movement of the turbine elements with relation to the supporting structure; and means connecting the exhaust of one of the turbine elements with the inlet of the other turbine element and providing for the transmission of slight axial movements of either of the turbine elements to the other element; said last-mentioned means including a motive fluid connection on each of the turbine elements, a rigid conduit connecting the motive fluid connections of the turbine elements, a flexible fluid-tight connection between the rigid conduit and at least one of the motive fluid connections and so constructed and arranged as to transmit movements which are in planes parallel to the axis of the turbine elements, from the conduit to such connection and vice-versa, and means associated with the flexible connection for pivotally supporting the end of the rigid conduit from said motive fluid connection.

6. In a power installation, the combination of a supporting structure; a pair of steam turbine elements connected in tandem relation; means for securing the turbine elements to the supporting structure and including means providing for a slight axial movement of the turbine elements with relation to the supporting structure; and means connecting the exhaust of one of the turbine elements with the inlet of the other turbine element and providing for the transmission of slight axial movements of either of the turbine elements to the other element; said last-mentioned means including a motive fluid connection on each of the turbine elements, a rigid conduit connecting the motive fluid connections of the turbine elements, a flexible fluid-tight connection between the rigid conduit and at least one of the motive fluid connections and so constructed and arranged as to transmit movements which are in planes parallel to the axis of the turbine elements, from the conduit to such connection and vice-versa, and means associated with the flexible connection for pivotally supporting the end of the rigid conduit from said motive liquid connection, the axis of said supporting means being arranged transversely of the axis of the turbine elements.

7. In a power installation, the combination of a supporting structure; a pair of steam turbine elements connected in tandem relation; means for securing the turbine elements to the supporting structure and including means providing for a slight axial movement of the turbine elements with relation to the supporting structure; and means connecting the exhaust of one of the turbine elements with the inlet of the other turbine element and providing for the transmission of slight axial movements of either of the turbine elements to the other element; said last-mentioned means including a motive fluid connection on each of the turbine elements, a rigid connection connecting the motive fluid connections of the turbine elements, a flexible fluid-tight connection between the rigid conduit and at least one of the motive fluid connections and including a transversely disposed diaphragm arranged in a plane parallel to the axis of rotation of the turbine elements, and means associated with the flexible connection for pivotally supporting the end of the rigid conduit from such motive fluid connection, the axis of the pivotal supporting means being arranged transversely of the axis of the turbine elements.

8. In a power installation, the combination of a supporting structure, a pair of steam turbine elements arranged horizontally and connected in tandem relation to one another; means for securing the turbine elements to the supporting structure and including means providing for a slight axial movement of the turbine elements with relation to the supporting structure; and conduit means connecting the exhaust of one of the turbine elements with the inlet of the other turbine element and providing for the transmission of slight axial movements of either of the turbine elements to the other turbine element; said conduit means including a flexible fluid-tight connection comprising a diaphragm disposed in a plane disposed transversely of the adjacent portions of the conduit means and parallel to the axis of the turbine elements.

In testimony whereof, I have hereunto subscribed my name this 25th day of March, 1927.

FRANCIS HODGKINSON.